(12) United States Patent
Giesseler et al.

(10) Patent No.: US 8,442,705 B2
(45) Date of Patent: May 14, 2013

(54) METHOD AND DEVICE FOR DETERMINING AERODYNAMIC CHARACTERISTICS OF AN AIRCRAFT

(75) Inventors: Hans-Gerd Giesseler, Halstenbek (DE); Wilfried Stegelmeier, Jork (DE); Chloé Tauzin, Courbevoie (FR)

(73) Assignee: Airbus Operations GmbH, Hamburg (DE)

( * ) Notice: Subject to any disclaimer, the term of this patent is extended or adjusted under 35 U.S.C. 154(b) by 528 days.

(21) Appl. No.: 12/704,661

(22) Filed: Feb. 12, 2010

(65) Prior Publication Data

US 2010/0222945 A1  Sep. 2, 2010

Related U.S. Application Data

(60) Provisional application No. 61/156,183, filed on Feb. 27, 2009.

(51) Int. Cl.
*G06F 19/00* (2011.01)

(52) U.S. Cl.
USPC ..................................... 701/14; 701/3; 703/2

(58) Field of Classification Search ................ 701/3, 14; 703/2
See application file for complete search history.

(56) References Cited

U.S. PATENT DOCUMENTS

| | | | |
|---|---|---|---|
| 4,480,480 A * | 11/1984 | Scott et al. | 73/769 |
| 4,949,269 A | 8/1990 | Buisson | |
| 6,553,333 B1 * | 4/2003 | Shenk | 702/182 |
| 6,782,346 B2 * | 8/2004 | Bond et al. | 702/183 |
| 7,236,914 B1 * | 6/2007 | Zyskowski | 703/8 |
| 8,014,906 B2 * | 9/2011 | Luo | 701/3 |
| 2005/0051666 A1 * | 3/2005 | Lee et al. | 244/10 |
| 2005/0096801 A1 | 5/2005 | Luo | |
| 2009/0157364 A1 * | 6/2009 | Velazquez Lopez et al. | 703/8 |
| 2009/0171634 A1 * | 7/2009 | Bensch et al. | 703/2 |
| 2011/0184591 A1 * | 7/2011 | Kordt | 701/3 |

FOREIGN PATENT DOCUMENTS

| | | |
|---|---|---|
| DE | 102009001220 | 9/2010 |
| EP | 0 743 582 | 11/1996 |

OTHER PUBLICATIONS

Hinds et al., Measurement of the longitudinal static stability and the moments of inertia of a 1/12th scale model of a B.Ae Hawk, May 1990, College of Aeronautics Report No. 9009.*

(Continued)

*Primary Examiner* — Thomas Black
*Assistant Examiner* — Sara Lewandroski
(74) *Attorney, Agent, or Firm* — Jenkins, Wilson, Taylor & Hunt, P.A.

(57) ABSTRACT

The present invention provides a device and method for determining aerodynamic characteristics of an aircraft, in particular a pitch moment coefficient at an ascending force of the aircraft without a horizontal tail plane of zero and an aerodynamic neutral point of the aircraft without a horizontal tail plane. In the method according to the invention, forces and mechanical flight parameters on aerofoils and a horizontal tail plane of the aircraft are detected at various detection instants during at least one non-stationary flight maneuvre of the aircraft. In this case, a linear system of equations is formed, which comprises a pitch movement moment balance equation for each detection instant, the pitch movement moment balance equation having the detected forces and mechanical flight parameters. This linear system of equations is evaluated to calculate the aerodynamic characteristics.

13 Claims, 3 Drawing Sheets

OTHER PUBLICATIONS

Maxim, Geometric algorithms for input constrained systems with application to flight control, Dec. 2007, De Montfort University thesis.*

Shkarayev et al., An inverse interpolation method utilizing in-flight strain measurements for determining loads and structural response of aerospace vehicles, 2001, NASA.*

German Office Action for DE 10 2009 001 220.6 dated Sep. 21, 2009.

* cited by examiner

METHOD AND DEVICE FOR DETERMINING AERODYNAMIC CHARACTERISTICS OF AN AIRCRAFT

CROSS-REFERENCE TO RELATED APPLICATIONS

This application claims the benefit of U.S. Provisional Application No. 61/156,183, filed Feb. 27, 2009, the entire disclosure of which is herein incorporated by reference.

FIELD OF THE INVENTION

The present invention relates to a method and a device for determining aerodynamic characteristics of an aircraft, in particular aerodynamic characteristics which can be used for subsequent simulation to verify a permissible load.

During the development of an aircraft, limited information exists about its aerodynamic data, which originate, for example, from wind tunnel tests on aircraft models. After the production of a prototype of the respective aircraft, this prototype is therefore subjected to flight tests (FT), in which mechanical flight data and load measurements are carried out on the aircraft to validate existing data models of the aircraft and to verify that the components of the aircraft are actually configured in such a way that they reliably withstand the loads occurring during flight manoeuvres, i.e. force and moment distributions.

In the conventional procedure for determining aerodynamic characteristics of an aircraft, the aircraft to be investigated is brought to a stationary flight state, for example to a flight straight ahead with a vertical load factor of approximately one. A centre of gravity variation i.e. a displacement of the centre of gravity of the aircraft is then caused by means of a fluid being pumped from one ballast tank into another ballast tank. For example, water is pumped from one ballast tank into another ballast tank, whereby the centre of gravity of the aircraft as a whole is displaced. On the basis of forces and mechanical flight parameters determined during the stationary flight state at various centres of gravity, aerodynamic characteristics can be determined with which the characteristics obtained from the wind tunnel are adapted and the validity of the aircraft configuration can be confirmed or refuted.

Furthermore, the characteristics determined during the further identification of the aircraft aerodynamics can be considered trustworthy, the process being simplified by the reduction in ambiguity thereby achieved.

This conventional procedure has the drawback, however, that water has to be transferred between ballast tanks or water tanks, this being time-consuming because of the limited flow capacity of the tubes and pumps located in between. Moreover, the volume capacity of the ballast tanks and their position in the aircraft limit the scope of possible variation of the centre of gravity of the aircraft. This means a high expenditure of time to carry out these measurements and high costs connected therewith.

Furthermore, it has been found that the aerodynamic characteristics determined in this manner are relatively imprecise and have a high degree of scatter.

SUMMARY OF THE INVENTION

It is therefore an object of the present invention to provide a method and a device for determining aerodynamic characteristics of an aircraft, in which the aerodynamic characteristics are determined with high precision with simultaneously low outlay.

This object is achieved according to the invention by a method with the features disclosed in claim 1.

The invention provides a method for determining aerodynamic characteristics of an aircraft comprising the steps:

(a) Detecting forces and mechanical flight parameters on aerofoils and a horizontal tail plane of the aircraft at various detection instants during at least one non-stationary flight manoeuvre of the aircraft; and (b) Evaluation of a system of equations, which comprises, for each detection instant, a pitch movement moment balance equation, which has the detected forces and mechanical flight parameters, to calculate the aerodynamic characteristics of the aircraft.

An advantage of the method according to the invention is that, apart from stationary flight manoeuvres, non-stationary flight manoeuvres can also be used to determine the aerodynamic characteristics of the aircraft. As non-stationary or dynamic flight manoeuvres of this type, for example a pitch manoeuvre, are in any case carried out to achieve a predetermined vertical load factor for the approval of an aircraft, these non-stationary flight manoeuvres can also be carried out in the method according to the invention without additional outlay to determine the aerodynamic characteristics.

In an embodiment of the method according to the invention, a pitch moment coefficient at an ascending force of the aircraft without a horizontal tail plane of zero and an aerodynamic neutral point of the aircraft without a horizontal tail plane are determined as aerodynamic characteristics of the aircraft by evaluating the system of equations.

In an embodiment of the method according to the invention, the forces and mechanical flight parameters are recorded during the flight manoeuvre and the system of equations is evaluated at a later instant on the basis of the recorded forces and the mechanical flight parameters.

In an alternative embodiment of the method according to the invention, the evaluation of the system of equations takes place on the basis of the forces and mechanical flight parameters recorded during the flight manoeuvre directly in real time.

In an embodiment of the method according to the invention, the system of equations is formed by an overdetermined linear system of equations, which is solved by a numerical optimisation method, for example by the method of the least error squares.

As the linear system of equations is an overdetermined linear system of equations, the scatter of the calculated aerodynamic characteristics is small and the aerodynamic characteristics can be determined with a high degree of calculation accuracy.

In an embodiment of the method according to the invention, the flight manoeuvre carried out is mainly a longitudinal movement manoeuvre of the aircraft. The flight manoeuvre does not therefore have to be a pure longitudinal movement; lateral movement states or fractions are also permissible.

In an embodiment of the method according to the invention, a spindle force is detected by sensors in a trimming spindle of the horizontal tail plane and bearing forces are detected in a left and right rotary bearing of the horizontal tail plane during the flight manoeuvre.

In an embodiment of the method according to the invention, a vertical load factor at a centre of gravity of the aircraft, a vertical load factor at a centre of gravity of a trimming tank and a vertical load factor at a centre of gravity of the horizontal tail plane are detected by sensors during the flight manoeuvre or derived from detected sensor data.

In an embodiment of the method according to the invention, the vertical ascending force $F_z^{wfp}$ of the aircraft without a horizontal tail plane is calculated as a function of the spindle and bearing forces of the horizontal tail plane detected by sensors and of the detected or derived vertical load factors by means of the following vertical load factor equation:

$$-mgn_z^{cg} = F_z^{wfp} + \frac{1}{co}[F_z^{screw} + F_z^{attach\ L+R} - m^{HTP}gn_z^{HTP} - m^{TT}gn_z^{TT}]$$

wherein co is a predetermined carry over factor,
g is the gravitational constant,
m is the mass of the aircraft,
$m^{HTP}$ is the mass of the horizontal tail plane,
$m^{TT}$ the mass of the trimming tank,
$n_z^{cg}$ is the vertical load factor at the centre of gravity of the aircraft,
$n_z^{HTP}$ is the vertical load factor at the centre of gravity of the horizontal tail plane,
$n_z^{TT}$ is the vertical load factor at the centre of gravity of the trimming tank,
$F_z^{screw}$ is the spindle force in the trimming spindle of the horizontal tail plane, and
$F_z^{attach\ L+R}$ are the bearing forces in a left and right rotary bearing of the horizontal tail plane.

In an embodiment of the method according to the invention, the pitch movement moment balance equation has the vertical ascending force $F_z^{wfp}$ calculated by the vertical load factor equation, without a horizontal tail plane:

$$qSl_\mu C_{m0} + F_z^{wfp}\frac{l_\mu}{100}h_0 = (\vec{I\dot\omega})_y + (\vec\omega \times \vec{I\omega})_y - qSl_{drag}C_x + F_z^{wfp}h\frac{l_\mu}{100} - $$
$$\frac{1}{co}[F_z^{screw}l^{screw} + F_z^{attach\ L+R}l^{attach} - m^{HTP}gn_z^{HTP}l^{HTP} + m^{TT}gn_z^{TT}l^{TT}] - $$
$$T_{outer}l^{outer} - T_{inner}l^{inner} - qSl_\mu \frac{\partial C_m}{\partial n_z}n_z^{cg} - I_{yy}^{HTP+TT}\dot\omega_y$$

wherein
$\omega$=rotation rate of the aircraft,
q is the occurring back pressure,
S is the area of the aerofoil of the aircraft,
$l_\mu$ the aerodynamic wing depth of the aerofoil,
$h_0$ is the aerodynamic neutral point of the aircraft without a horizontal tail plane,
$T_{outer}$ is the thrust of the outer engines mounted on the aerofoil,
$T_{inner}$ is the thrust of the inner engines mounted on the aerofoil,
$C_x$ is the coefficient of aerodynamic force,
$l_{drag}$, $l^{screw}$, $l^{attach}$, $l^{HTP}$, $l^{TT}$, $l^{outer}$, $l^{inner}$ are the lever arm lengths for the air drag, the trimming spindle loads, the rotary bearing loads, the inertial force of the horizontal tail plane HTP, the inertial force of the trimming tank TT, the thrust of the outer engines and the thrust of the inner engines.

In an embodiment of the method according to the invention the overdetermined linear system of equations formed from pitch movement moment balance equations for m detection instants:

$$\begin{bmatrix} qSl_\mu(1) & F_z^{wfp}\frac{l_\mu}{100}(1) \\ \vdots & \vdots \\ \vdots & \vdots \\ \vdots & \vdots \\ qSl_\mu(m) & F_z^{wfp}\frac{l_\mu}{100}(m) \end{bmatrix} \begin{bmatrix} C_{m0} \\ h_0 \end{bmatrix} = \begin{bmatrix} b(1) \\ \vdots \\ \vdots \\ \vdots \\ b(m) \end{bmatrix}$$

is solved according to the pitch moment coefficient $c_{m0}$ and the aerodynamic neutral point of the aircraft without a horizontal tail plane, wherein b is the inhomogeneity of the overdetermined linear system of equations.

The invention also provides a device with the features disclosed in claim 11.

The invention provides a device for determining aerodynamic characteristics of an aircraft comprising:

(a) Sensors for detecting forces and mechanical flight parameters on aerofoils and a horizontal tail plane of the aircraft at various detection instants during at least one non-stationary flight manoeuvre of the aircraft; and comprising (b) A calculation unit to evaluate a system of equations, which for each detection instant comprises a pitch movement moment balance equation, which has the detected forces and mechanical flight parameters to calculate the aerodynamic characteristics of the aircraft.

In an embodiment of the device according to the invention the latter is mounted in the aircraft.

In an alternative embodiment of the device according to the invention, sensors are mounted on the aircraft, the forces and mechanical flight parameters detected by the sensors being transmitted via a radio interface to a base station which has the calculation unit.

The invention furthermore provides a programme with programme commands for carrying out a method for determining aerodynamic characteristics of an aircraft, comprising the steps:

(a) Detecting forces and mechanical flight parameters on aerofoils and a horizontal tail plane of the aircraft at various detection instants during at least one non-stationary flight manoeuvre of the aircraft; and (b) Evaluation of a system of equations, which comprises, for each detection instant, a pitch movement moment balance equation, which has the detected forces and mechanical flight parameters to calculate the aerodynamic characteristics of the aircraft.

The invention also provides a data carrier which stores a programme of this type.

BRIEF DESCRIPTION OF THE DRAWINGS

Embodiments of the method according to the invention and the device according to the invention to determine aerodynamic characteristics of an aircraft will be described below with reference to the accompanying figures, in which.

DESCRIPTION OF EXEMPLARY EMBODIMENTS

Figure 1:
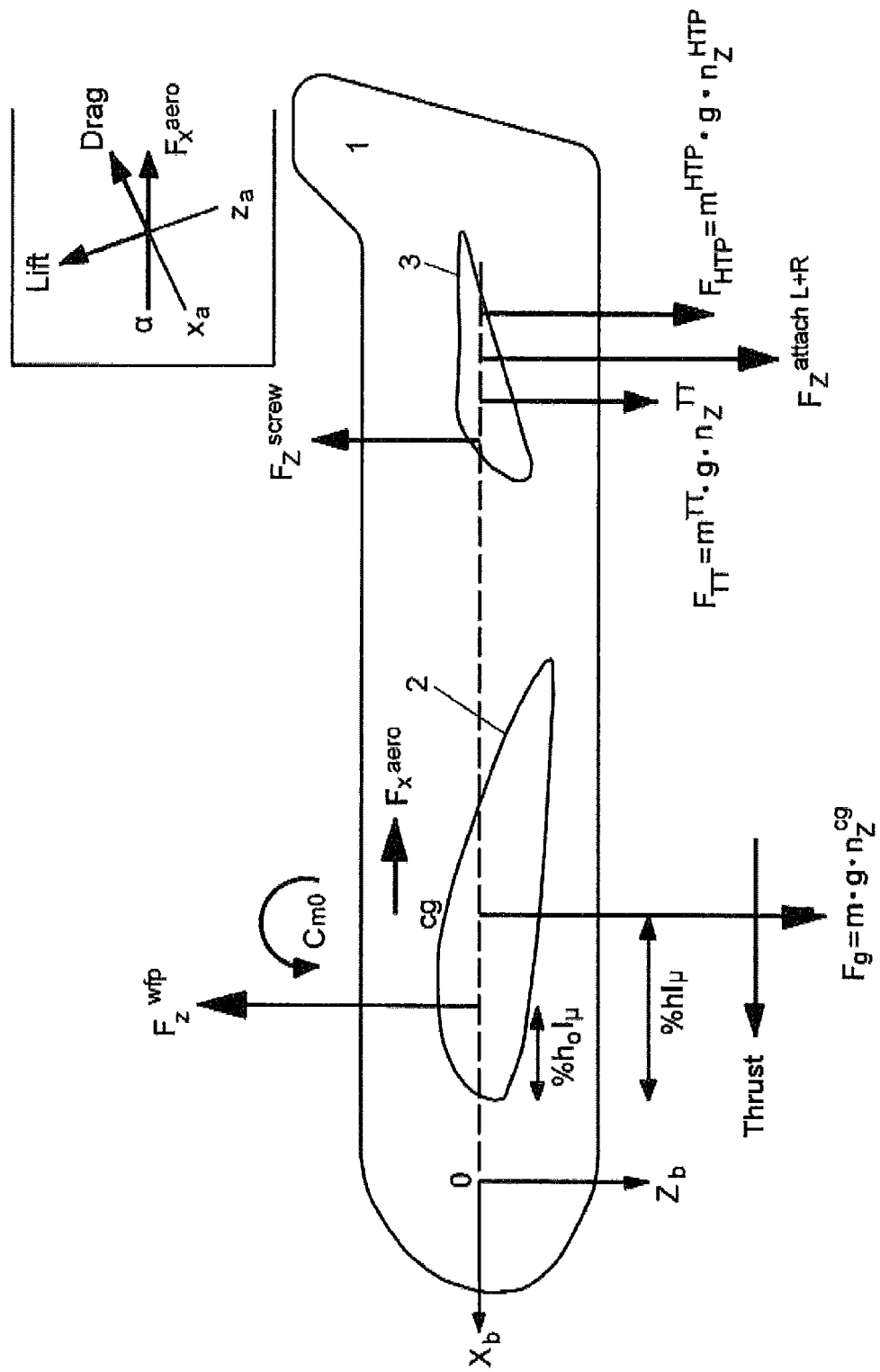
FIG. 1 shows a schematic view of the forces and mechanical flight parameters detected in the method according to the invention to determine the aerodynamic characteristics.

FIG. 1 schematically shows forces and mechanical flight parameters which are detected by the method according to the invention to determine aerodynamic characteristics.

An aircraft 1 with aerofoils 2 and a horizontal tail plane 3 are shown schematically in FIG. 1. A centre of gravity cg of the aircraft 1 is also shown in FIG. 1. An ascending force component $F_z^{wfp}$ engages on the aerofoils 2 of the aircraft 1. The force of gravity $F_g = m \cdot g \cdot n_z^{cg}$ acts on the centre of gravity cg of the aircraft 1. The horizontal tail plane 3 has a trimming spindle, the spindle force $F_z^{screw}$ acting on the trimming spindle being detected, as shown in FIG. 1. Present in a trimming tank of the horizontal tail plane 3 is fuel, the mass $m^{TT}$ of which is also subjected to the force of gravity. This force $F_{TT}$ is also shown schematically in FIG. 1. The horizontal tail plane (HTP) 3 also has a mass $m^{HTP}$, which leads to a force of gravity $F_{HTP}$. Moreover, the bearing forces $F_z^{attach\,L+R}$ are detected in the meantime by sensors in a left and right rotary bearing of the horizontal tail plane 3.

The vertical ascending force $F_z^{wfp}$ of the aircraft 1 without a horizontal tail plane HTP can be calculated using the forces F shown in FIG. 1 with the aid of a vertical load factor equation.

$$-m \cdot g \cdot n_z^{cg} = (F_{aero})_z$$

$$-m \cdot g \cdot n_z^{cg} = F_z^{wfp} + F_z^{HTP}$$

$$-mgn_z^{cg} = F_z^{wfp} + \frac{1}{co}[F_z^{screw} + F_z^{attachL+R} - m^{HTP}gn_z^{HTP} - m^{TT}gn_z^{TT}]$$

wherein co is a predetermined carry over factor,
g is the gravitational constant,
m is the mass of the aircraft 1,
$m^{HTP}$ is the mass of the horizontal tail plane 3,
$m^{TT}$ is the mass of a trimming tank of the horizontal tail plane 3,
$n_z^{cg}$ is the vertical load factor at the centre of gravity cg of the aircraft 1,
$n_z^{HTP}$ is the vertical load factor at the centre of gravity of the horizontal tail plane 3,
$n_z^{TT}$ is the vertical load factor at the centre of gravity of the trimming tank,
$F_z^{screw}$ is the spindle force in the trimming spindle of the horizontal tail plane 3,
$F_z^{attach\,L+R}$ is the bearing forces in a left and right rotary bearing of the horizontal tail plane 3.

The predetermined carry over factor co is, for example, 0.9. The vertical ascending force $F_z^{wfp}$ of the aircraft 1 without a horizontal tail plane 3 provides the ascending force which the remainder of the aircraft 1 has without a horizontal tail plane 3, i.e. the aerofoils and the fuselage of the aircraft 1 (WFP: Wing/Fuselage/Pod).

Apart from the vertical load factor equation, the aircraft 1 satisfies a pitch movement moment balance equation:

$$(\vec{I\omega})_y = -(\omega \times \vec{I\omega})_y + \Sigma \vec{M}_y$$

wherein I is the inertia of the aircraft 1 and ω is the rotation or angle rate. $M_y$ designates torques in the longitudinal direction of the aircraft 1.

The pitch movement moment balance equation can be given as below stating the variables given in the vertical load factor equation:

$$qSl_\mu C_{m0} + F_z^{wfp}\frac{l_\mu}{100}h_0 = (\vec{I\dot{\omega}})_y + (\vec{\omega} \times \vec{I\omega})_y - qSl_{drag}C_x + F_z^{wfp}h\frac{l_\mu}{100} -$$
$$\frac{1}{co}[F_z^{screw}l^{screw} + F_z^{attachL+R}l^{attach} - m^{HTP}gn_z^{HTP}l^{HTP} + m^{TT}gn_z^{TT}l^{TT}] -$$
$$T_{outer}l^{outer} - T_{inner}l^{inner} - qSl_\mu\frac{\partial C_m}{\partial n_z}n_z^{cg} - I_{yy}^{HTP+TT}\dot{\omega}_y$$

wherein ω is the rotation rate of the aircraft 1,
q is the occurring back pressure,
S is the area of the aerofoils 2 of the aircraft 1,
$l_\mu$ is the aerodynamic wing depth of the aerofoils 2,
$h_0$ is the aerodynamic neutral point of the aircraft 1 without a horizontal tail plane 3,
$T_{outer}$ is the thrust of the outer engines mounted on the aerofoil 2,
$T_{inner}$ is the thrust of the inner engines mounted on the aerofoil 2,
$C_x$ is the coefficient of aerodynamic force,
$l^{drag}, l^{screw}, l^{attach}, l^{HTP}, l^{TT}, l^{outer}, l^{inner}$ are the lever arm lengths for the air drag, the trimming spindle loads, the rotary bearing loads, the inertial force of the horizontal tail plane HTP, the inertial force of the trimming tank TT, the thrust of the outer engines and the thrust of the inner engines.

Located on the left side of the pitch movement moment balance equation given above are two relevant aerodynamic characteristics of the aircraft 1, namely the pitch moment coefficient $C_0$ at an ascending force of the aircraft 1 without a horizontal tail plane 3 of zero and an aerodynamic neutral point $h_0$ of the aircraft 1 without a horizontal tail plane 3. FIG. 1 schematically shows the pitch moment coefficient $C_0$ at an ascending force of the aircraft without a horizontal tail plane of zero. This coefficient gives a ratio between the ascending force or output on the free horizontal tail plane with circulation around it for the total ascending force on the horizontal tail plane, the vertical tail and the fuselage of the aircraft.

The other aerodynamic characteristic to be calculated is the aerodynamic neutral point $h_0$ of the aircraft 1 without a horizontal tail plane 3. At this neutral point $h_0$ the pitch moment of the aircraft 1 remains constant even with a changing oncoming flow angle.

The thrust $T_{outer}, T_{inner}$ of the engines are derived from measured engine parameters. The coefficient $C_x$ of the aerodynamic force $F_x^{aero}$, as shown schematically in FIG. 1, is a dimensionless variable, which inter alia depends on the profile of the aircraft 1 and influences the air drag of the aircraft $F_x^{aero}$.

Using the pitch movement moment balance equation given above, an overdetermined linear system LGS of equations can be generated for m detection instants t:

$$\begin{bmatrix} qSl_\mu(1) & F_z^{wfp}\frac{l_\mu}{100}(1) \\ \vdots & \vdots \\ \vdots & \vdots \\ \vdots & \vdots \\ qSl_\mu(m) & F_z^{wfp}\frac{l_\mu}{100}(m) \end{bmatrix} \begin{bmatrix} C_{m0} \\ h_0 \end{bmatrix} = \begin{bmatrix} b(1) \\ \vdots \\ \vdots \\ \vdots \\ b(m) \end{bmatrix}$$

$$A \cdot \begin{bmatrix} C_{M0} \\ h_0 \end{bmatrix} = b$$

The overdetermined linear system LGS of equations consists of an m×2 matrix A, which, multiplied by an aerodynamic characteristic vector, produces an inhomogeneity vector b, the variables of which are constant or known or detected by sensors. The inhomogeneity b corresponds to the right side of the above-mentioned pitch movement moment balance equation. This overdetermined linear system of equations can be solved by a numerical optimisation method, such as, for example, the method of least error squares LS (least square), according to the vector for the aerodynamic characteristics $C_{m0}$, $h_0$ as follows (where $A^{-1}$ quite generally designates the pseudo inverse of A here):

$$\begin{bmatrix} C_{m0} \\ h_0 \end{bmatrix} = A^{-1} \cdot b$$

Figure 2:
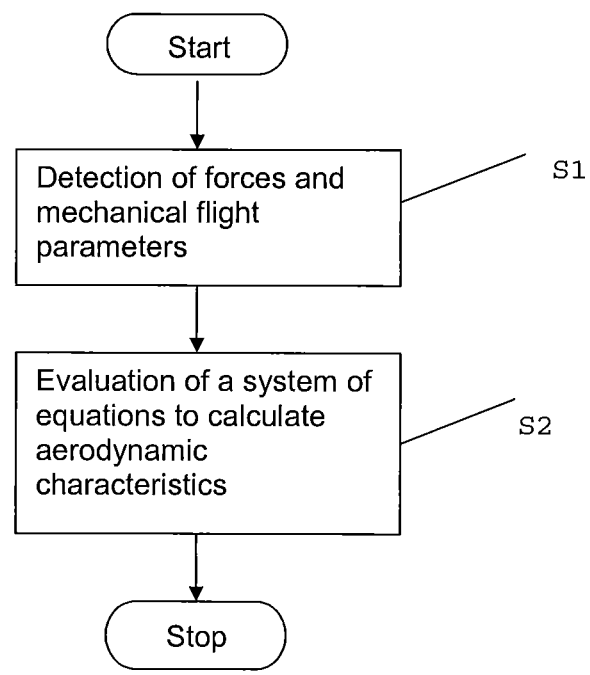
FIG. 2 shows a flowchart of a possible embodiment of the method according to the invention to determine aerodynamic characteristics of an aircraft.

FIG. 2 shows a flowchart which clarifies the procedure of the method according to the invention for determining the aerodynamic characteristics, for example the pitch moment coefficient $C_{m0}$ and the neutral point $h_0$.

In a step S1, the forces F and the mechanical flight parameters on the aerofoils 2 and the horizontal tail plane 3 of the aircraft 1 are firstly detected at various detection instants t during at least one non-stationary or stationary flight manoeuvre of the aircraft 1. For example, the forces and mechanical flight parameters are detected during the flight manoeuvre at regular time intervals, for example every 30 or 60 msec, so that m pitch movement moment balance equations can be set up and can be inserted in the linear system LGS of equations.

In one possible embodiment, the detected forces and mechanical flight parameters are recorded and stored during the flight manoeuvre. In this embodiment, the linear system LGS of equations is evaluated at a later instant.

In a further step S2, the linear system LGS of equations, which comprises, for each detection instant t, a pitch movement moment balance equation, which has the detected forces and mechanical flight parameters, is evaluated to calculate the aerodynamic characteristics of the aircraft 1. The linear system LGS of equations is evaluated in a possible embodiment after the aircraft 1 has landed on the basis of the forces and mechanical flight parameters recorded during the flight manoeuvre.

In an alternative embodiment, the linear system LGS of equations is already evaluated during the flight or during the flight manoeuvre in real time. The system of equations is solved, for example, by means of a method of least error squares LS.

Figure 3A:
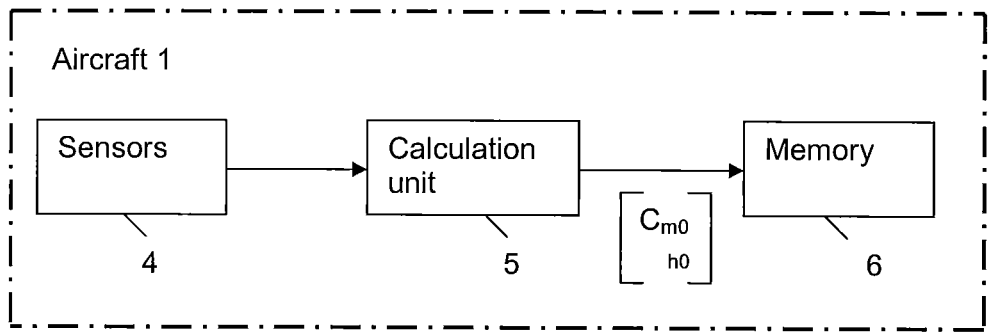
FIGS. 3A, 3B show block diagrams of possible embodiments of the device according to the invention to determine aerodynamic characteristics.

FIG. 3A shows a possible embodiment of the device according to the invention for determining aerodynamic characteristics in an aircraft 1. In this embodiment, the device for determining aerodynamic characteristics is located in the aircraft 1. Forces and mechanical flight parameters on the aerofoils 2 and the horizontal tail plane 3 of the aircraft 1 are detected by sensors 4 at various detection instants t during a stationary or non-stationary flight manoeuvre of the aircraft 1 or derived from the sensor data. The sensors 4 shown in FIG. 3A, for example, have rotation rate sensors, force sensors or acceleration sensors. A calculation unit 5 mounted in the aircraft 1 evaluates the linear system LGS of equations produced and calculates aerodynamic characteristics of the aircraft 1, for example the pitch moment coefficient $C_{m0}$ and the neutral point $h_0$ of the aircraft 1. These determined aerodynamic characteristics $C_{m0}$, $h_0$ are stored, for example, in a memory 6 for later simulation. The calculation unit 5 is formed, for example, by a CPU or a microprocessor.

Figure 3B:
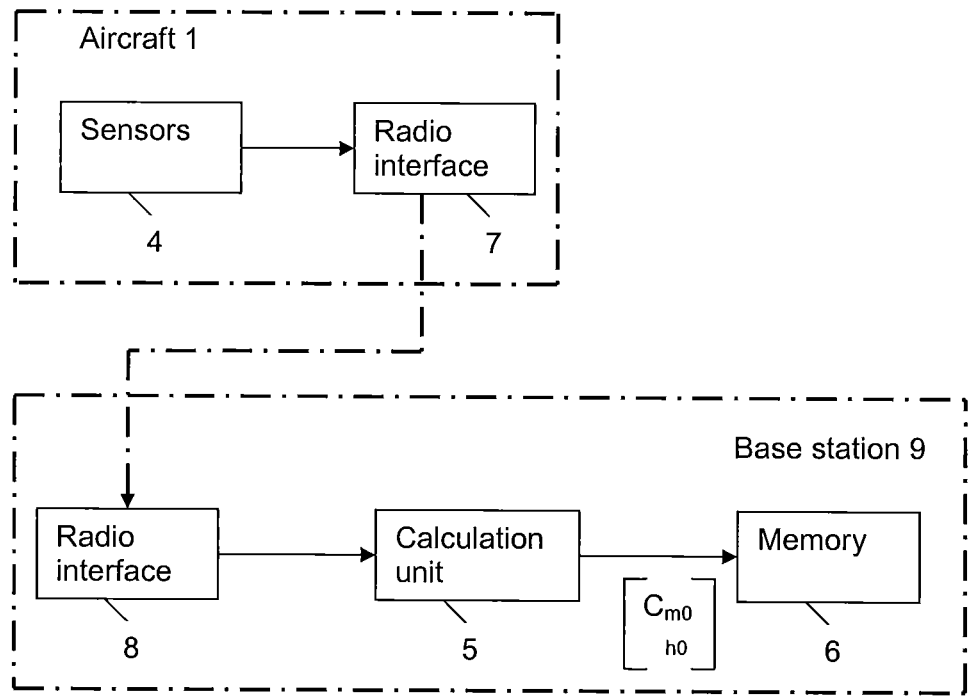

FIG. 3B shows an alternative embodiment of the device according to the invention for determining aerodynamic characteristics of the aircraft 1. In this embodiment, sensors 4 supply sensor data to a radio interface 7 within the aircraft 1, which transmits the sensor data to a radio interface 8 of a base station 9. The base station 9 has a calculation unit 5, which writes the calculated aerodynamic characteristics in a memory 6, which is also located in the base station 9. The memory 6 is, for example, a database.

In an alternative embodiment of the method according to the invention, the tail loads can be determined based on horizontal tail plane internal force variables. These may replace or supplement the measurement data of the trimming spindle and the horizontal tail plane bearing loads. In a possible embodiment, the air load fraction, which acts on the fuselage of the aircraft 1, is additionally taken into account here by a transfer factor and the inertial loads outside the horizontal tail plane internal force variables are deducted.

The procedure according to the invention allows important aerodynamic characteristics or parameters, for example the pitch moment coefficient $C_{m0}$ and the aerodynamic neutral point $h_0$ to be determined easily even during a non-stationary flight manoeuvre. The determination or calculation of the aerodynamic characteristics may take place in a very short time as a time-consuming transfer or a displacement of the centre of gravity during a stationary flight manoeuvre is dispensed with. The method according to the invention allows protracted flight manoeuvres to achieve stationary flight states purely to determine aerodynamic characteristics to be dispensed with, so the overall development of the aircraft 1 is accelerated. The method according to the invention is also relatively insensitive to lateral effects, so continuous flight turning manoeuvres to determine the aerodynamic characteristics can also be flown. The signal-to-noise ratio of the method according to the invention is high and the precision when calculating the aerodynamic characteristics is also high because of the overdetermination of the linear system LGS of equations.

The invention claimed is:

1. A method for determining aerodynamic characteristics of an aircraft:
    (a) detecting forces and mechanical flight parameters by sensors on aerofoils and a horizontal tail plane of the aircraft at various detection instants during at least one non-stationary flight manoeuvre of the aircraft; and
    (b) evaluation of a system of equations by a calculation unit, the system comprising, for each detection instant, a pitch movement moment balance equation, which has the detected forces and mechanical flight parameters, to calculate the aerodynamic characteristics of the aircraft;
    wherein a spindle force in a trimming spindle of the horizontal tail plane and bearing forces in a left and right rotary bearing of the horizontal tail plane are detected by sensors during the flight manoeuvre; and
    wherein a vertical ascending force $F_z^{wfP}$ of the aircraft without a horizontal tail plane is calculated as a function of the spindle forces and bearing forces of the horizontal tail plane detected by the sensors and of detected or derived vertical load factors by the following vertical load factor equation:

$$-mgn_z^{cg} = F_z^{wfp} + \frac{1}{co}[F_z^{screw} + F_z^{attachL+R} - m^{HTP}gn_z^{HTP} - m^{TT}gn_z^{TT}]$$

wherein co is a predetermined carry over factor,
g is the gravitational constant,
m is the mass of the aircraft, $m^{HTP}$ is the mass of the horizontal tail plane,
$m^{TT}$ is the mass of the trimming tank,
$n_z^{cg}$ is the vertical load factor at the centre of gravity of the aircraft,
$n_z^{HTP}$ is the vertical load factor at the centre of gravity of the horizontal tail plane,
$n_z^{TT}$ is the vertical load factor at the centre of gravity of the trimming tank,
$F_z^{screw}$ is the spindle force in the trimming spindle of the horizontal tail plane,
$F_z^{attach\ L+R}$ is the bearing forces in a left and right rotary bearing of the horizontal tail plane.

2. The method according to claim 1, wherein by evaluating the system of equations, a pitch moment coefficient at an ascending force of the aircraft without a horizontal tail plane of zero and an aerodynamic neutral point of the aircraft without a horizontal tail plane are determined as the aerodynamic characteristics.

3. The method according to claim 1, wherein the evaluation of the system of equations on the basis of forces and mechanical flight parameters recorded during the flight manoeuvre takes place at a later instant or in real time.

4. The method according to claim 1, wherein the system of equations is formed by a linear system of equations, which is solved by an overdetermined numerical optimisation method.

5. The method according to claim 1, wherein the flight manoeuvre is primarily a longitudinal movement manoeuvre of the aircraft.

6. The method according to claim 1, wherein the pitch movement moment balance equation has the vertical ascending force $F_z^{wfp}$ of the aircraft calculated by the vertical load factor equation, without a horizontal tail plane:

$$qSl_\mu C_{m0} + F_z^{wfp}\frac{1\mu}{100}h_0 = (\dot{I\omega})_y + (\vec{\omega} \times \vec{I\omega})_y - qSl_{drag}C_x + F_z^{wfp}h\frac{1\mu}{100} -$$

$$\frac{1}{co}[F_z^{screw}l^{screw} + F_z^{attachL+R}l^{attach} - m^{HTP}gn_z^{HTP}l^{HTP} + m^{TT}gn_z^{TT}l^{TT}] -$$

$$T_{outer}l^{outer} - T_{inner}l^{inner} - qSl_\mu \frac{\partial C_m}{\partial n_z}n_z^{cg} - I_{yy}^{HTP+TT}\dot{\omega}_y$$

wherein
ω=rotation rate of the aircraft,
q is the occurring back pressure,
S is the area of an aerofoil of the aircraft,
$l_\mu$ is the aerodynamic wing depth of the aerofoil,
$h_0$ is the aerodynamic neutral point of the aircraft without a horizontal tail plane,
$T_{outer}$ is the thrust of the outer engines mounted on the aerofoil,
$T_{inner}$ is the thrust of the inner engines mounted on the aerofoil,
$C_x$ is the coefficient of aerodynamic force,
$l^{drag}, l^{screw}, l^{attach}, l^{HTP}, l^{TT}, l^{outer}, l^{inner}$ are the lever arm lengths for the air drag, the trimming spindle loads, the rotary bearing loads, the inertial force of the horizontal tail plane HTP, the inertial force of the trimming tank TT, the thrust of the outer engines and the thrust of the inner engines.

7. The method according to claim 1, wherein a vertical load factor at the centre of gravity of the aircraft, a vertical load factor at a centre of gravity of a trimming tank and a vertical load factor at a centre of gravity of the horizontal tail plane are detected by sensors during the flight manoeuvre or derived from sensor data.

8. The method according to claim 6, wherein the system of equations is an overdetermined linear system of equations and wherein the overdetermined linear system formed from pitch movement moment balance equations form detection instants:

$$\begin{bmatrix} qSl_\mu(1) & F_z^{wfp}\frac{1\mu}{100}(1) \\ \vdots & \vdots \\ \vdots & \vdots \\ \vdots & \vdots \\ qSl_\mu(m) & F_z^{wfp}\frac{1\mu}{100}(m) \end{bmatrix} \begin{bmatrix} C_{m0} \\ h_0 \end{bmatrix} = \begin{bmatrix} b(1) \\ \vdots \\ \vdots \\ \vdots \\ b(m) \end{bmatrix}$$

is solved according to the pitch moment coefficient and the aerodynamic neutral point of the aircraft without a horizontal tail plane, wherein b is the inhomogeneity of the overdetermined linear system of equations.

9. A non-transitory programme with programme commands for carrying out the method according to claim 1.

10. A non-transitory data carrier which stores the programme according to claim 9.

11. A device for determining aerodynamic characteristics of an aircraft comprising:
(a) Sensors for detecting forces and mechanical flight parameters on aerofoils and a horizontal tail plane of the aircraft at various detection instants during at least one non-stationary flight manoeuvre of the aircraft; and comprising
(b) A calculation unit to evaluate a system of equations, which for each detection instant comprises a pitch movement moment balance equation, which has the detected forces and mechanical flight parameters to calculate the aerodynamic characteristics of the aircraft
wherein a spindle force in a trimming spindle of the horizontal tail plane and bearing forces in a left and right rotary bearing of the horizontal tail plane are detected by sensors during the flight manoeuvre; and
wherein a vertical ascending force $F_z^{wfp}$ of the aircraft without a horizontal tail plane is calculated as a function of the spindle forces and bearing forces of the horizontal tail plane detected by the sensors and of detected or derived vertical load factors by the following vertical load factor equation:

$$-mgn_z^{cg} = F_z^{wfp} + \frac{1}{co}[F_z^{screw} + F_z^{attachL+R} - m^{HTP}gn_z^{HTP} - m^{TT}gn_z^{TT}]$$

wherein co is a predetermined carry over factor,
g is the gravitational constant,
m is the mass of the aircraft,
$m^{HTP}$ is the mass of the horizontal tail plane,
$m^{TT}$ is the mass of the trimming tank,
$n_z^{cg}$ is the vertical load factor at the centre of gravity of the aircraft,
$n_z^{HTP}$ is the vertical load factor at the centre of gravity of the horizontal tail plane,
$n_z^{TT}$ is the vertical load factor at the centre of gravity of the trimming tank,
$F_z^{screw}$ is the spindle force in the trimming spindle of the horizontal tail plane,
$F_z^{attach\ L+R}$ is the bearing forces in a left and right rotary bearing of the horizontal tail plane.

12. The device according to claim 11, wherein the device is mounted on the aircraft.

13. The device according to claim 11, wherein the sensors are mounted on the aircraft and transmit the detected forces and mechanical flight parameters via a radio interface to a base station having the calculation unit.

* * * * *